United States Patent [19]
Pittman

[11] Patent Number: 5,527,103
[45] Date of Patent: Jun. 18, 1996

[54] CABINET OF IMPROVED DESIGN AND CONSTRUCTION

[76] Inventor: Charles Pittman, 4446 Lomina Ave., Lakewood, Calif. 90713

[21] Appl. No.: 130,236

[22] Filed: Oct. 1, 1993

[51] Int. Cl.⁶ ............................................. A47B 47/03
[52] U.S. Cl. .............. 312/263; 312/265.5; 312/257.1; 312/265.3; 312/265.4; 217/12 R
[58] Field of Search ........................ 312/257.1, 263, 312/265.5, 111; 217/12 R, 13, 65; 220/4.31; 108/180

[56] References Cited

U.S. PATENT DOCUMENTS

| | | | |
|---|---|---|---|
| 1,215,713 | 2/1917 | Ruggles | 217/12 R |
| 2,729,355 | 1/1956 | Gaston | 217/12 R |
| 2,956,705 | 10/1960 | Clingman | 217/12 R X |
| 3,069,216 | 12/1962 | Vaeth | 108/180 |
| 3,143,236 | 8/1964 | Haas | 217/12 R |
| 3,195,507 | 7/1965 | Miller | 217/12 R X |
| 3,261,492 | 7/1966 | Johnson | 217/12 R |
| 4,126,364 | 11/1978 | Reilly | 312/263 X |
| 4,153,311 | 5/1979 | Takahashi | 312/265.5 X |
| 4,700,986 | 10/1987 | Davis et al. | 312/263 X |
| 4,832,421 | 5/1989 | Shoffner | 312/263 |
| 5,263,772 | 11/1993 | Ritzow | 312/111 |

*Primary Examiner*—Kenneth J. Dorner
*Assistant Examiner*—Rodney B. White
*Attorney, Agent, or Firm*—Plante & Strauss

[57] ABSTRACT

There is disclosed a cabinet which is formed of wood substrate panels in which a plurality of flat side and end panels have end slots which interlocked together to form a cabinet subassembly. Each end slot extends half the height of its respective panel and has a sufficient width to receive the next adjacent panel in the subassembly. The final assembly also includes top and bottom frames formed of interconnected stringers, one stringer each coextensive with the top edge of each of the flat panels, with each of the stringers having a groove coextensive its length which receives the top edge of its respective panel, thereby interlocking the assembly without use of mechanical fasteners or glue into a strong cabinet which resists racking.

14 Claims, 3 Drawing Sheets

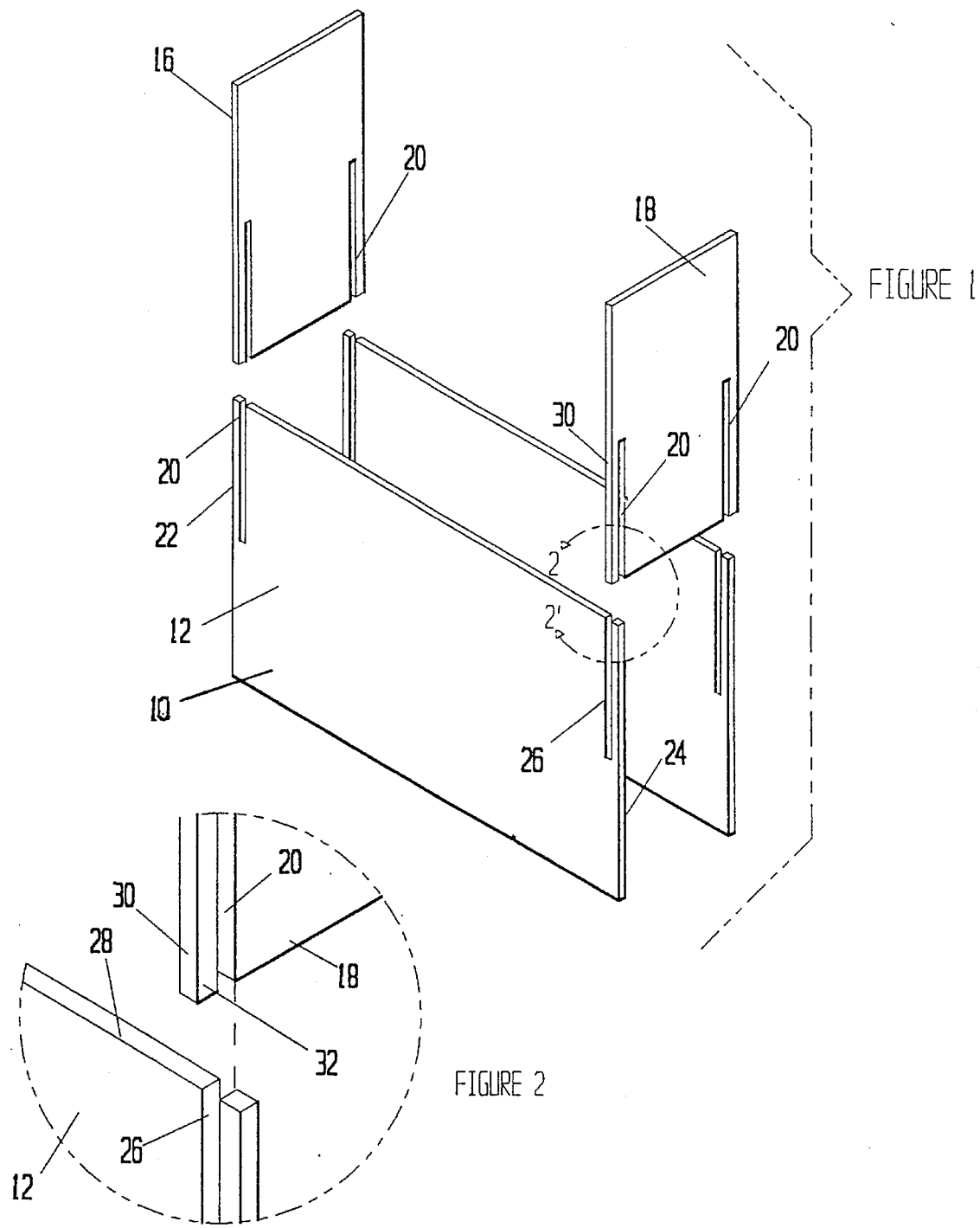

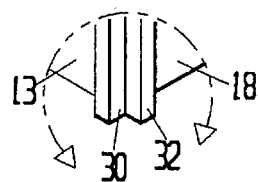
FIGURE 4
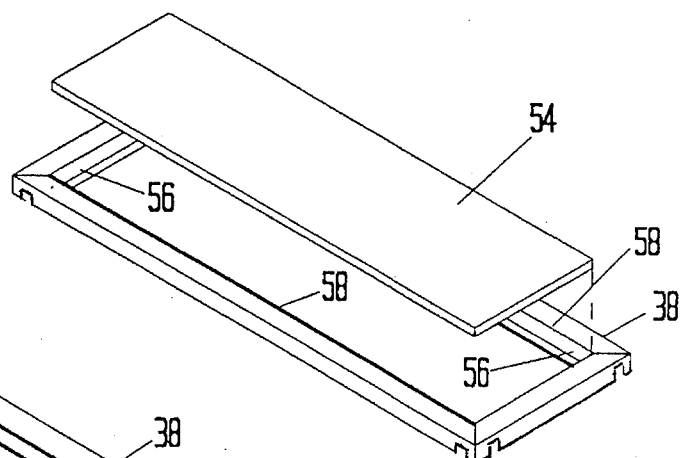
FIGURE 6
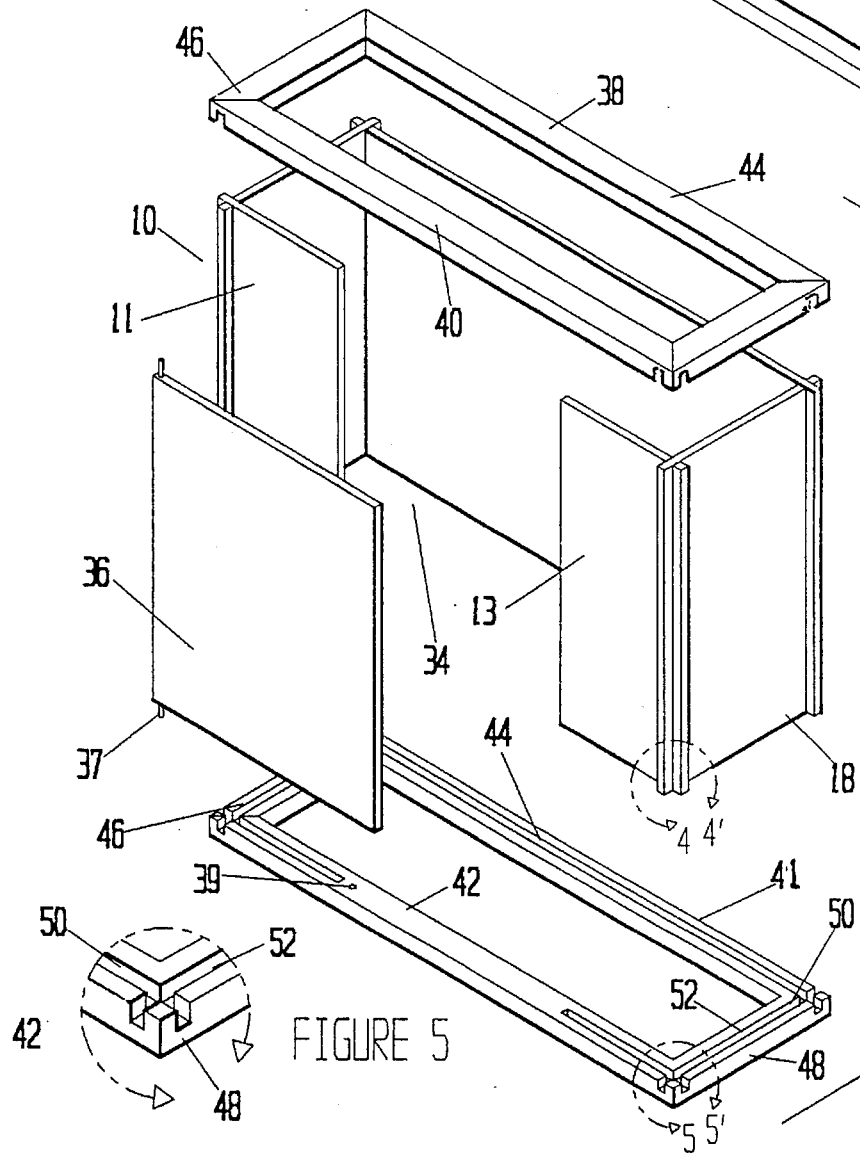
FIGURE 3
FIGURE 5

CABINET OF IMPROVED DESIGN AND CONSTRUCTION

BACKGROUND OF INVENTION

1. Field of Invention

This invention relates to a cabinet and, in particular, to a cabinet suitable for use as an aquarium stand.

2. Brief Statement of the Prior Art

Wood cabinets of various designs and shapes have been employed as base cabinets for various purposes, including stands for aquariums. These base cabinets must be of sturdy construction and sufficiently rigid and strong to accept the substantial loadings encountered with aquariums. As a consequence, most aquarium stands are preassembled by the factory and rely on mechanical fasteners and glue or adhesives for joint assembly. The preassembled cabinets are not economical as they are bulky and expensive to store and ship. Additionally, most stores do not have sufficient storage space to stock a complete inventory of different sizes of aquarium stands because of the large volume required for storage of preassembled cabinets.

OBJECTIVES OF THE INVENTION

It is an objective of this invention to provide a base cabinet which can be manufactured from wood substrate sheet material and can be stored and shipped in knock-down, flat configuration.

It is also an objective of this invention to provide the aforementioned base cabinet with interlocking joints which can be assembled and secured without use of mechanical fasteners or glue.

It is a further objective of this invention to provide the aforementioned cabinet which can be assembled and disassembled by the consumer.

It is a still further objective of the invention to provide the aforementioned cabinet with sufficient strength and rigidity to function as a base cabinet for supporting an aquarium.

Other and related objectives will be apparent from the following description of the invention.

BRIEF STATEMENT OF THE INVENTION

This invention comprises a cabinet which is formed of wood substrate panels in which a plurality of flat side panels have end slots which interlocked together to form a cabinet assembly. Each end slots extends half the height of its respective panel and has a sufficient width to receive the next adjacent panel in the assembly. The assembly also includes top and bottom frames formed of interconnected stringers, one stringer each coextensive with the top edge of each of the flat panels, with each of the stringers having a groove coextensive its length which receives the top edge of its respective panel, thereby interlocking the assembly into a strong cabinet which resists racking.

BRIEF DESCRIPTION OF THE DRAWINGS

FIG. 1 is an exploded perspective view of the subassembly of side panels of the cabinet;

FIG. 2 is an enlarged view of the area within line 2—2' of FIG. 1;

FIG. 3 is an exploded perspective view of the side panel subassembly and top and bottom frames of the cabinet;

FIG. 4 is an enlarged view of the area within line 4—4' of FIG. 3;

FIG. 5 is an enlarged view of the area within line 5—5' of FIG. 3;

FIG. 6 is a view of an alternative top frame and cover for the cabinet of FIG. 3;

DESCRIPTION OF PREFERRED EMBODIMENT

Figure 7:
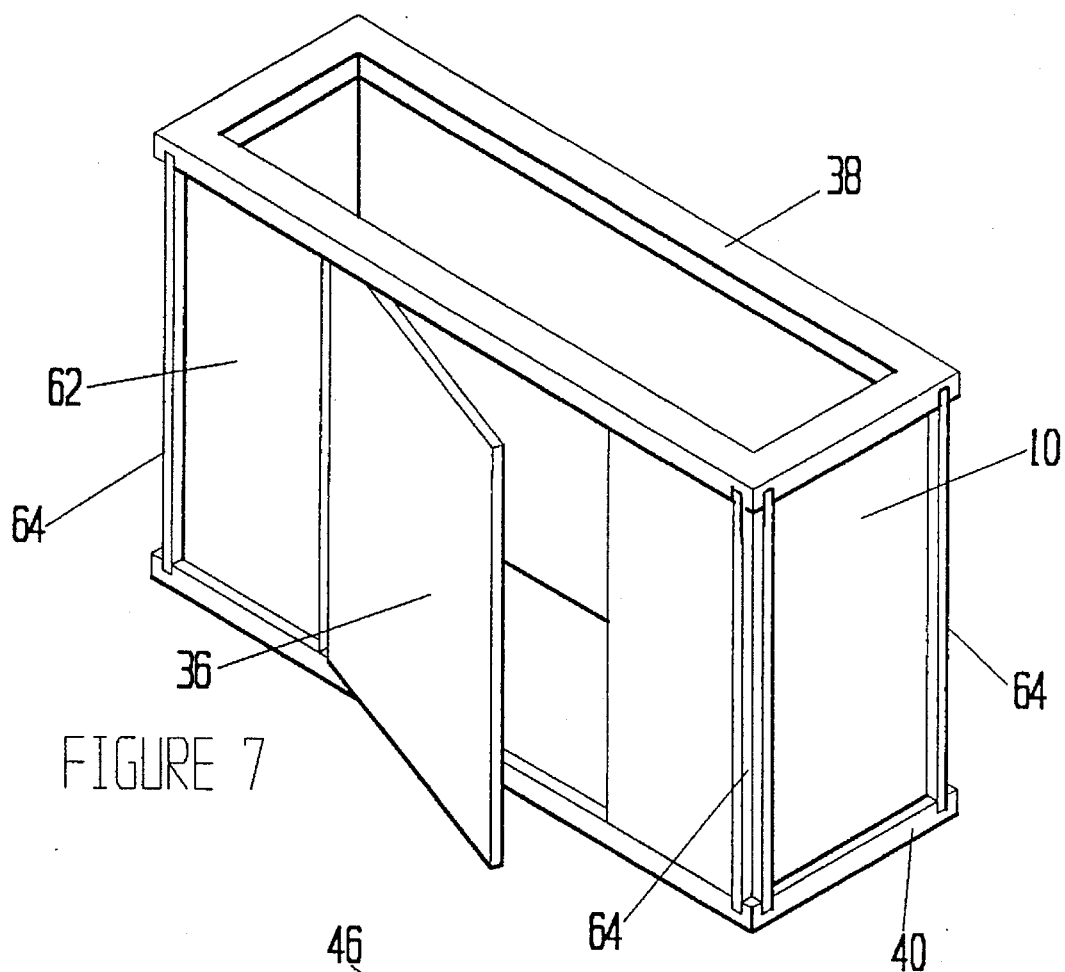
FIG. 7 is a perspective view of the assembled cabinet.
Figure 8:
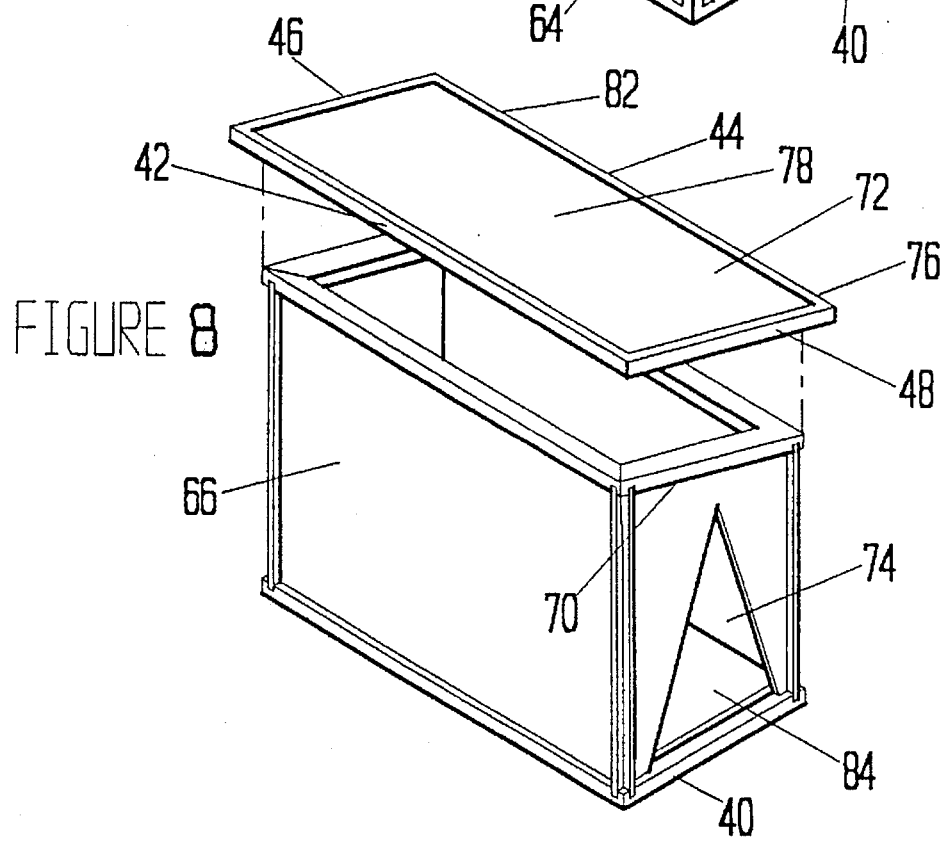
FIG. 8 is a perspective view of a dog house constructed as the cabinet of this invention.

The side panel subassembly 10 used for the cabinet of this invention is shown in exploded perspective view in FIGS. 1 and 2. The side panels 12 and 14, and the end panels 16 and 18 are formed of wood substrate sheet material, e.g., plywood, oriented strand board, press board, chip board, etc. Preferably, plywood is used to provide maximum strength and stability.

The side and end panels are cut to the desired exterior dimensions, and each panel is provided with an end slot 20 adjacent each of the panel end edges 22 and 24. As shown for panel 12, the slots 20 and 26 are cut into the panel 12, extending from a common longitudinal edge 28 for a distance equal to one-half the width of the panel.

As shown in FIG. 2, the end slots 20 are spaced from the adjacent end edge 30 of the panels by a distance which is from 0.5 to 2 times the thickness of the panel. Preferably the distance is equal to the thickness of the panel, thereby forming a prong 32 having a square cross section. The width of the slot 20 is equal to the thickness of the adjacent panel which is received in the slot. Thus, each end slot in each panel has a width equal to the thickness of the interlocking, adjacent panel, i.e., slot 26 in side panel 12 has a thickness equal to the thickness of panel 18. In most of the applications, the end and side panels will be formed of wood substrate sheet material of uniform thickness, e.g., of ¾ inch plywood, and each end slot will be ¾ inch wide.

The end and side panels are interlocked together to form a subassembly of side panels. This is accomplished in the manner shown in FIG. 1 where the side panels are placed in a side-by-side spaced-apart array, and the end panels are slid into the slots with the ends slots of the end panels fitting over the unslotted portion of the side panels to form a half lap joint.

FIG. 4 illustrates the subassembly 10 of the side and end panels. The particular assembly illustrated in FIG. 4 includes two partial side panels 11 and 13 which are spaced apart to provide an opening 34 in the final cabinet which is closed by a door 36 that is inserted during the assembly by inserting dowel pins 37, which are received in the top and bottom edges of the door 36, into receiving apertures 39 in the bottom frame 40 and in the top frame 38. After the side and end panels are placed in the subassembly 10 shown in FIG. 4, the cabinet is completed by interlocking the subassembly 10 of Side and end panels with the top frame 38 and bottom frame 41. These frames are substantially identical and each comprises a pair of side stringers 40 and 44 and a pair of end stringers 46 and 48 forming a rectangular frame. These stringers can be permanently assembled into a frame at the factory with various assembly techniques, e.g., mitered joints which are secured with mechanical fasteners, splines, etc.

Each of the stringers has a coextensive, centrally located slot 50 and 52 having a thickness equal to the thickness of the side and end panels. The slots 50 and 52 form a cross slot at each corner as illustrated in FIG. 5. The slots of each top and bottom frame receive the respective bottom and top edges of the subassembly 10 of flat panels.

The cabinet illustrated in FIG. 3 has an open top frame 38. As shown in FIG. 6, the top frame can also include a top panel 54 which could rest on the upper surfaces of the frame 38 or, preferably, in rabbets 56 which are cut on the inside upper edges 58 of the top frame. Similarly, the bottom frame 41 can support a flat bottom panel 60 which can simply be laid on the bottom frame inside the subassembly 10 of side panels. Alternatively, the bottom frame 41 can be rabbeted in the manner illustrated for the top frame 38 of FIG. 6 to accept a panel which is flush with the upper surface of the bottom frame.

The assembled cabinet 62 is illustrated in FIG. 7. The half-lap joints 64 at each corner of the subassembly 10 of side and end panels are received in the cross slots 50 and 52 of the upper frame 38 and lower frame 41 forming very secure joints. Since the prongs 32 (see FIG. 2) which are formed by cutting the slots 20 are also received in the slots 50 and 52, these prongs are secured against damage. The entire assembly is completed without the use of any mechanical fastener, adhesives or glues and the assembled cabinet is very strong and rigid and resists racking side to side or top to bottom because of the interlocking of the side panels with each other and with the top and bottom frames.

FIG. 9 illustrates a dog house 66 which can be fabricated with the cabinet of the invention. In this embodiment, the end panels 68 have beveled upper ends 70 to impart a pitch to the roof 72 for water drainage, and one end panel has a cut out 74 of a size and shape for a pet door. The upper frame 76 is formed of stringers 40 as previously described, however, the longitudinal stringers 40 and 44 are grooved on their undersurface at the pitch angle of the beveled upper ends 70 of the end panels 68. A roof panel 78 which preferably is of slightly greater width and length than the top frame 76 is provided, to obtain a slight overhang of the roof panel 78. If desired, the edges 80 of the roof panel 78 can be covered with a thin strip of veneer, or with edging 82. A bottom panel 84 is placed within the cabinet, resting on the bottom frame 41 to complete the dog house.

The cabinet can be economically manufactured by simple fabrications such as routing or cutting of the slots and dados in the wood substrate members. After fabrication, the cabinet is packaged, shipped and stored in a flat, two dimensional package ready for assembly by the user. Since the entire assembly can be effected without the use of any fasteners, glues or clamps, the end user can readily assembly the cabinet into its final configuration. Also, the cabinet can be repeatedly disassembled and assembled without any difficulty or weakening.

The top and bottom frames greatly enhance the rigidity of the subassembly of side panels and resist racking of these panels. Additionally, the prongs formed by the slots in the panels are retained in corresponding slots of the top and bottom frames, thereby strengthening these fingers and preventing breaking of the fingers during fabrication or use of the stand.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A cabinet comprising:

a. a plurality of interlocked flat wood side panels, each panel having a slot adjacent to and extending along each of its two vertical edges for half the length of said vertical edges, with said slots arranged in opposite directions on adjacent side panels and with each slot having a width substantially equal to the thickness of the immediately adjacent side panel and spaced in from its respective edge a slight distance to form a narrow prong with each slot receiving said immediately adjacent side panel to form interlocked side walls of said cabinet;

b. a wood top frame formed of a like plurality of interconnected stringers, one each coextensive with the top edge of each of said side panels, each of said stringers having a groove coextensive its length and receiving therein a respective top edge of said side panels and the top edge of its respective prongs; and c. a wood bottom frame formed of a like plurality of interconnected stringers, one each coextensive with the bottom edge of each of said side panels, each of said stringers having a groove coextensive its length and receiving therein a respective bottom edge of said side panels, with said top and bottom frames received over the top and bottom edges, respectively, of said side panels without mechanical fasteners, adhesives or glue between said side panels and frames to secure said side panels in a rigid, racking resistant assembly and to secure said prongs against damage.

2. The cabinet of claim 1 wherein four side panels are assembled to provide a cabinet having opposite and parallel side walls and opposite and parallel end walls.

3. The cabinet of claim 2 wherein said side panels are assembled and retained together without any mechanical fasteners and entirely by the interlocking of said side panels and top and bottom frames.

4. The cabinet of claim 3 wherein at least one of said side panels is formed with two spaced-apart partial side panels, framing an opening therebetween, and including a door pivotally supported to close said opening.

5. The cabinet of claim 4 wherein said door is provided with top and bottom stub shafts which extend from top and bottom edges thereof and which are received in aligned apertures in said top and bottom frames, thereby providing pivotal support of said door in said assembly.

6. The cabinet of claim 1 including a top panel received within said top frame.

7. The cabinet of claim 6 wherein each of the stringers of said top frame has a groove along their inside edges and said top panel is received within said grooves.

8. An aquarium stand [having opposite which comprises two flat wood side panels interlocked together with two opposite end panels, with each of said panels having a slot adjacent to and extending half its vertical height along each of its vertical edges, with said slots arranged in opposite directions on adjacent end and side panels and with each slot having a width substantially equal to the thickness of the immediately adjacent panel and spaced in from its respective edge a slight distance to form a narrow prong with each slot receiving said immediately adjacent panel to form interlocked vertical walls of said cabinet;

a. a wood top frame formed of two longitudinal and two lateral stringers interconnected to form a rectangular frame, one of each stringer being coextensive with the top edge of each of said side and end panels, each of said stringers having a groove coextensive its length and receiving therein the top edge of its respective panel and the top edge of its respective prongs; and b. a wood bottom frame formed of two longitudinal and two lateral stringers interconnected to form a rectangular frame, one of each of said stringers being coextensive with the bottom edge of each of said side and end panels, with each of said stringers having a groove coextensive its length and receiving therein the bottom edge of its respective panel, with said top and bottom frames received over the top and bottom edges, respectively, of said side panels without mechanical fasteners, adhesives or glue between said side panels and frames to secure said side panels in a rigid, racking resistant assembly and to secure said prongs against damage.

9. The aquarium stand of claim 8 wherein said side panels are assembled and retained together without any mechanical fasteners and entirely by the interlocking of said side panels and top and bottom frames.

10. The aquarium stand of claim 9 wherein the slot at one end of each of said panels extends from the top edge of said panel and the slot at the opposite end of each of said panels extends from the bottom edge of each said panel.

11. The aquarium stand of claim 10 wherein at least one of said side panels is formed with two spaced-apart partial side panels, framing an opening therebetween, and including a door pivotally supported to close said opening.

12. The aquarium stand of claim 11 wherein said door is provided with top and bottom stub shafts which extend from top and bottom edges thereof and which are received in aligned apertures in said top and bottom frames, thereby providing pivotal support of said door in said assembly.

13. The aquarium stand of claim 9 including a top panel received within said top frame.

14. The aquarium stand of claim 13 wherein each of the stringers of said top frame has a groove along their inside edges and said top panel is received within said grooves.

* * * * *

UNITED STATES PATENT AND TRADEMARK OFFICE
CERTIFICATE OF CORRECTION

PATENT NO. : 5,527,103
DATED : Jun. 18, 1996
INVENTOR(S) : Charles Pittman

It is certified that error appears in the above-indentified patent and that said Letters Patent is hereby corrected as shown below:

In Claim 8, Column 4, line 50, delete "[having opposite"

Signed and Sealed this

Eighth Day of October, 1996

Attest:

BRUCE LEHMAN

Attesting Officer

Commissioner of Patents and Trademarks